United States Patent
Galli et al.

(10) Patent No.: US 11,701,718 B2
(45) Date of Patent: Jul. 18, 2023

(54) TOOL UNIT AND SWITCHABLE TOOL SYSTEM FOR A TOOL UNIT

(71) Applicant: Ledermann GmbH & Co. KG, Horb am Neckar (DE)

(72) Inventors: Oliver Galli, Nufringen (DE); Benjamin Sitzler, Sulz (DE)

(73) Assignee: Ledermann GmbH & Co. KG, Horb am Neckar (DE)

( * ) Notice: Subject to any disclaimer, the term of this patent is extended or adjusted under 35 U.S.C. 154(b) by 122 days.

(21) Appl. No.: 17/383,110

(22) Filed: Jul. 22, 2021

(65) Prior Publication Data

US 2022/0032414 A1 Feb. 3, 2022

(30) Foreign Application Priority Data

Jul. 31, 2020 (EP) .................................... 20188974

(51) Int. Cl.
*B23C 3/12* (2006.01)
*B23Q 3/155* (2006.01)

(52) U.S. Cl.
CPC ............ *B23Q 3/15534* (2016.11); *B23C 3/12* (2013.01); *B23Q 3/1554* (2013.01);
(Continued)

(58) Field of Classification Search
CPC .......... B27D 5/006; B23C 3/12–3/128; B23C 2220/16; Y10T 409/304144;
(Continued)

(56) References Cited

U.S. PATENT DOCUMENTS

2016/0136838 A1* 5/2016 Kalmbach ............... B23C 3/122
144/48.2
2019/0299303 A1* 10/2019 Yabuta ...................... B23C 3/12

FOREIGN PATENT DOCUMENTS

DE       19915672 A1 * 10/2000
DE 20 2010 010 704 U1 11/2011
(Continued)

OTHER PUBLICATIONS

Article titled "Magnetic Field of a Bar Magnet", three pages, copyright 2023, obtained from the BBC's website at https://www.bbc.co.uk/bitesize/guides/zvk4t39/revision/1 on Mar. 21, 2023.*
(Continued)

*Primary Examiner* — Erica E Cadugan
(74) *Attorney, Agent, or Firm* — Walter Ottesen, P.A.

(57) ABSTRACT

A tool unit includes a tool head, a motor and a switching drive for the head. The head has a first section with first blades and a second section with second blades. The second section is movable to and fro between a passive and an active position relative to the first section, the second blades being retracted in the passive position, and the second blades projecting axially beyond the first blades in the active position. The drive includes an electromagnet and an actuating armature made from magnetically attractable material and is arranged in the region of action of the electromagnet. The electromagnet is positioned between the head and the motor and is fastened to a housing part of the motor such that it cannot be rotated. The armature is connected fixedly to the second section. A gap remains between the electromagnet and the armature in the passive and active position.

8 Claims, 2 Drawing Sheets

(52) U.S. Cl.
CPC ............ *B23Q 2003/155404* (2016.11); *Y10T 409/30448* (2015.01); *Y10T 409/304144* (2015.01); *Y10T 409/307168* (2015.01)

(58) Field of Classification Search
CPC . Y10T 409/307168; Y10T 409/307784; Y10T 409/308344; Y10T 409/308568; Y10T 409/309296; Y10T 409/30448; B27G 13/007
USPC ........ 409/138, 192, 203, 213, 217, 230, 144
See application file for complete search history.

(56) References Cited

FOREIGN PATENT DOCUMENTS

| EP | 2011614 A1 | * | 1/2009 |
| EP | 2363259 A1 | * | 9/2011 |
| EP | 2 492 071 A2 | | 8/2012 |
| EP | 2 492 071 B1 | | 8/2012 |

OTHER PUBLICATIONS

Article titled "Difference Between Hard Magnetic Material and Soft Magnetic Material", obtained from https://www.tutorialspoint.com/difference-between-hard-magnetic-material-and-soft-magnetic-material on Mar. 21, 2023.*
Machine Translation of EP 2492071 A2, which EP '071 was published Aug. 2012.*

* cited by examiner

TOOL UNIT AND SWITCHABLE TOOL SYSTEM FOR A TOOL UNIT

CROSS REFERENCE TO RELATED APPLICATION

This application claims priority of European patent application no. 20188974.8, filed Jul. 31, 2020, the entire content of which is incorporated herein by reference.

TECHNICAL FIELD

The disclosure relates to a tool unit for machining edges of a workpiece and to a switchable tool system for a tool unit of this type.

BACKGROUND

EP 2 492 071 B1 discloses a tool unit for machining edges of a workpiece. The tool unit extends along a rotational axis and includes a tool head, a drive motor for the rotational drive of the tool head about the rotational axis, and a switching drive for the tool head which can be switched over between different switching states. The tool head has a first tool section with a set of first blades which are distributed over the circumference, and a second tool section with a set of second blades which are distributed over the circumference. The second blades are positioned between the first blades as viewed in the circumferential direction. The second tool section can be moved to and fro between a passive position and an active position relative to the first tool section in the direction of the longitudinal axis via the switching drive, the second blades being retracted axially with respect to the first blades in the passive position, and the second blades projecting axially through between the first blades in the active position.

The tool head is situated at one axial end of the drive motor, whereas the switching drive is positioned at the opposite axial end. The switching drive can be of electro-pneumatic, electrohydraulic and/or electromagnetic configuration, and acts on a thrust cylinder, the movement of which acts via a drive spindle which is guided through the drive motor in the longitudinal direction on the opposite movable tool section and determines its switching position. Different milling profiles are used by way of switching over. By way of the selected drive configuration, the possibilities of the configuration and therefore the flexibility of the multiple profile milling apparatus are to be increased.

The stated aims are acquired, however, by way of a great mechanical complexity with a complex and highly integrated construction. The rotational drive and the switching drive have to be guided coaxially within one another and have to be mounted against one another. In addition to the associated high structural and cost outlay, wear with subsequent maintenance outlay is also produced at the bearing points. In the case of damage, the unit in its entirety has to be replaced or repaired. Standardized and therefore inexpensive drives cannot be used.

SUMMARY

It is an object of the invention to provide a structurally considerably simplified tool unit and in the process reduce wear phenomena and the resulting maintenance outlay.

The aforementioned object can, for example, be achieved by way of a tool unit for machining edges of a workpiece, wherein the tool unit extends along a rotational axis. The tool unit includes: a tool head extending along a rotational axis and defining a circumference; a drive motor configured to rotationally drive the tool head about the rotational axis and having a housing part; a switching drive for the tool head; the tool head including a first tool section having a set of first blades distributed over the circumference; the tool head including a second tool section having a set of second blades distributed over the circumference; each of the second blades being positioned between two of the first blades as viewed in a circumferential direction; the second tool section being configured to be movable to and fro between a passive position and an active position relative to the first tool section in a direction of the rotational axis via the switching drive; the second blades being axially retracted with respect to the first blades in the passive position; the second blades being axially projected with respect to the first blades in the active position; the switching drive including at least one electromagnet and an actuating armature which is made from a magnetically attractable material and is arranged in a region of action of the at least one electromagnet; the at least one electromagnet being positioned in an axial direction between the tool head and the drive motor; the at least one electromagnet being fastened to the housing part of the drive motor such that it cannot be rotated; the actuating armature being fixedly connected to the second tool section; and, the at least one electromagnet and the actuating armature defining a gap both in the passive position and in the active position.

Furthermore, it is an object of the invention to provide a switchable tool system for a tool unit which, with a simple construction and reliable function, can be used on a standardized drive motor.

The aforementioned object can, for example, be achieved by way of a switchable tool system for a tool unit, the tool unit including a drive motor having a housing part and a drive shaft. The switchable tool system includes: a tool head defining a circumference and configured to be rotationally driven about a rotational axis by the drive motor; a switching drive for the tool head; the tool head extending along the rotational axis; the tool head including a first tool section having a set of first blades distributed over the circumference; the tool head further including a second tool section having a set of second blades distributed over the circumference; each of the second blades being positioned between two of the first blades as viewed in a circumferential direction; the second tool section being configured to be moveable to and fro between a passive position and an active position relative to the first tool section in a direction of the rotational axis via the switching drive; the second blades being axially retracted with respect to the first blades in the passive position; the second blades being axially projected with respect to the first blades in the active position; the switching drive having an actuating armature which is made from a magnetically attractable material and at least one electromagnet configured to act on the actuating armature; the at least one electromagnet having a fastener for fastening to the housing part of the drive motor such that it cannot be rotated in an axial position between the tool head and the drive motor; the actuating armature being connected fixedly to the second tool section; and, the tool head having a fastening interface for fastening to the drive shaft of the drive motor.

It is provided in accordance with an aspect of the disclosure that the switching drive includes at least one electromagnet and an actuating armature which is made from a magnetically attractable material and is arranged in the region of action of the electromagnet. The at least one electromagnet is positioned in the axial direction between the tool head and the drive motor and is fastened to a housing part of the drive motor such that it cannot be rotated. The actuating armature is connected fixedly to the second tool section, a gap remaining between the at least one electromagnet and the actuating armature both in the passive position and in the active position.

The switchable tool system which corresponds to this includes the tool head and the switching drive. The at least one electromagnet has fastening means for fastening such that it cannot be rotated to a housing part of the drive motor in an axial position between the tool head and the drive motor. The corresponding tool head has a fastening interface for fastening to the drive shaft of the drive motor.

In an embodiment according to the disclosure, both the switchable tool head and the associated switching drive are situated on the same side of the tool unit and the drive motor, with the result that complicated transmission means can be dispensed with. Although a rotating relative movement is produced as a consequence of the fastening of the electromagnet to the housing part of the drive motor and the fastening of the actuating armature to the second tool section, no independent mounting between the two assemblies has to be provided to this end, since exclusive fastening of the tool head to the drive shaft of the drive motor is sufficient. In this way, the tool head is mounted solely via the mounting of the drive shaft, whereas the electromagnet is held fixedly on the motor such that it cannot be rotated, in a mechanically independent manner. In particular, direct contact between the two assemblies is absent as a consequence of the gap between the electromagnet and the actuating armature, with the result that the arrangement is wear-free in this regard. The switchable tool system can be mounted on any desired drive motor. Existing drive motors can be readily retrofitted with a switchable tool system according to the disclosure, since no intrusion into the interior of the drive motor is required.

The transmission of the electromagnetic attraction forces takes place without contact as a result of the gap. The gap merely has to ensure that no friction occurs, with the result that the gap can be of correspondingly small dimensions. As a consequence, great magnetic forces can be applied which ensure a reliable switchover between the different switching states or between the active and the passive position. Moreover, the switching position which is achieved can be held reliably.

It can be expedient to provide the actuating armature with permanent-magnetic properties with the use of a corresponding magnetically hard material. In a manner which is adapted to this, the electromagnet can be operated in changing polarities, which leads to attracting or repelling of the permanent magnet. As a consequence, the active and the passive position can be moved to and held solely by way of magnetic force. In a preferred embodiment, however, the actuating armature is manufactured from a magnetically soft material. Although, hereupon, only magnetic attraction forces with only a single corresponding switching direction can be applied, with the result that additional measures for a switching operation in the opposite direction have to be taken, the use of a magnetically soft material opens up a great selection of eligible materials which include, for example, tool steel. In this way, an inexpensive and nevertheless robust construction can be achieved.

In an embodiment, the second tool section is prestressed in the direction of the active position via a compression spring element in a manner which points away from the switching drive. The switching drive is configured, in the case of activation, to attract the second tool section out of the active position into the passive position counter to the prestressing force of the compression spring element. The arrangement manages with an only minimum control complexity. The polarity direction of the electromagnet is irrelevant. For the electromagnet, only the two operating states "energized" and "non-energized" are of significance, the electromagnet pulling the second tool section back into the passive position and holding it there in the energized state, whereas the compression spring element presses the second tool section forward into the active position and holds it there in the non-energized state of the electromagnet. With minimum complexity, a reliable and maintenance-free changeover between the two switching states and reliable holding of the switching state which has been achieved are possible.

Different possibilities come into question for the structural configuration. The compression spring element can preferably be configured, however, as a zigzag spring which is arranged concentrically with respect to the rotational axis. High switching and holding forces can be achieved with a small axial installation space. The coaxial configuration avoids tilting and canting.

The same also applies analogously for an embodiment, in the case of which the electromagnet is configured as a toric magnet, in the case of which the actuating armature is of annular configuration in a manner which corresponds to the toric magnet, and in the case of which the toric magnet and the annular actuating armature are arranged concentrically with respect to the rotational axis.

BRIEF DESCRIPTION OF THE DRAWINGS

The invention will now be described with reference to the drawings wherein.

DESCRIPTION OF THE PREFERRED EMBODIMENTS

Figure 1:
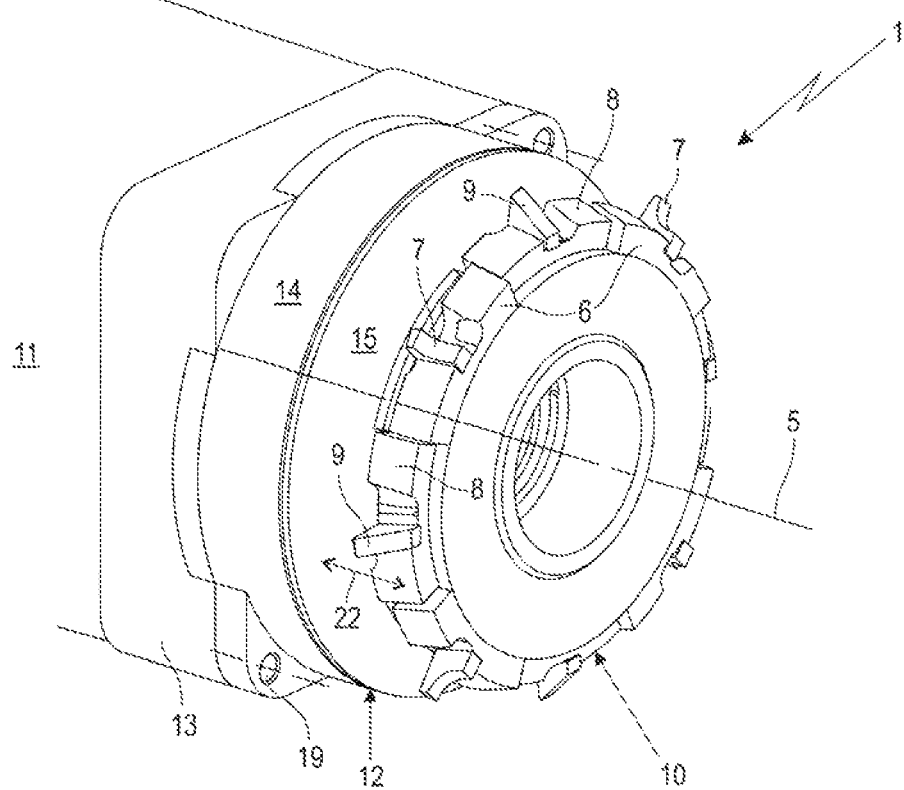
FIG. 1 shows a perspective view of the working region of a tool unit which is configured according to the disclosure with a tool head, a drive motor and a switching drive.

FIG. 1 shows a perspective view of the working region of a tool unit 1 which is configured according to the disclosure. The tool unit 1 is configured and provided to machine edges 2, 3 (shown in FIG. 4) of a workpiece 4, wood and wood-like materials such as particle boards with or without coating preferably being machined. The tool unit 1 extends in a generally concentric configuration along a rotational axis 5, and includes a tool head 10, a drive motor 11 for the rotational drive of the tool head about the rotational axis 5, and a switching drive 12 for the tool head 10, via which switching drive 12 the tool head 10 can be moved into different switching states for producing different edges 2, 3 (FIG. 4) with different edge profiles.

To this end, the tool head 10 has a first tool section 6 with a set of first blades 7 which are distributed over the circumference, and a second tool section 8 with a set of second blades 9 which are distributed over the circumference. The first blades 7 and the second blades 9 have blade profiles which differ from one another, the first blades 7 having a concave profile in the form of a circular section in the embodiment which is shown, whereas the second blades 9 are provided with a rectilinear blade profile which is angled away with respect to the rotational axis 5 and, here, lies by way of example at a 45° angle with respect to the rotational axis 5. Within the context of the disclosure, however, other blade profiles for the first blades 7 and the second blades 9 can also be used.

In any case, the second blades 9 are positioned between the first blades 7 as viewed in the circumferential direction, it being possible for the second tool section 8 to be moved to and fro in accordance with a double arrow 22 relative to the first tool section 6 in the direction of the rotational axis 5 via the switching drive 12 between a passive position and an active position.

According to an aspect of the disclosure, the switching drive 12 includes at least one electromagnet 14 and an actuating armature 15 which is made from a magnetically attractable material and is arranged in the region of action of the electromagnet 14. Here, the term "region of action" means that the electromagnet 14 acts on the actuating armature 15 in the case of corresponding actuation in such a way that the actuating armature 15 is displaced together with the second tool section 8 in the direction of the rotational axis 5, with the result that its switching position changes. To this end, the at least one electromagnet 14 is positioned between the tool head 10 and the adjoining front-side end of the drive motor 11 in the axial direction, that is, in the direction of the rotational axis 5. Moreover, the at least one electromagnet 14 is provided with fastening means 19 which are configured here as a bolt flange and via which the electromagnet 14 is fastened such that it cannot be rotated to a housing part 13 of the drive motor 11. Secondly, the actuating armature 15 is connected fixedly to the second tool section 8 for conjoint rotation, that is, rotates with the latter or as part of the tool unit 1 during operation about the rotational axis 5 relative to the stationary electromagnet 14 or to the stationary housing part 13 of the drive motor 11.

Figure 2:
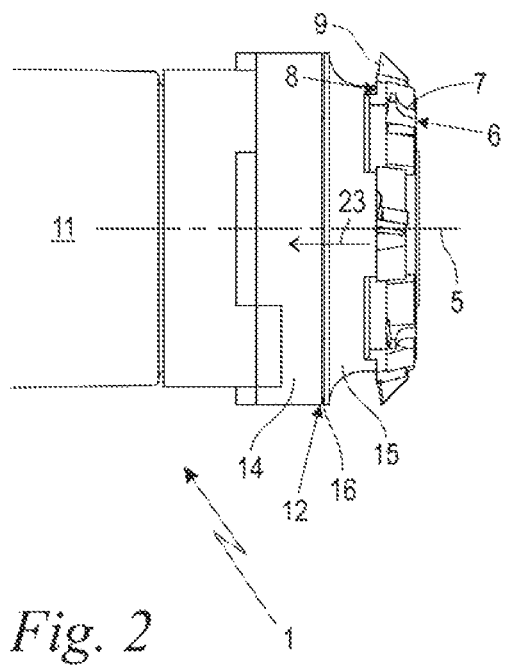
FIG. 2 shows a side view of the tool unit according to FIG. 1 with a second tool section which is retracted into its passive position.
Figure 3:
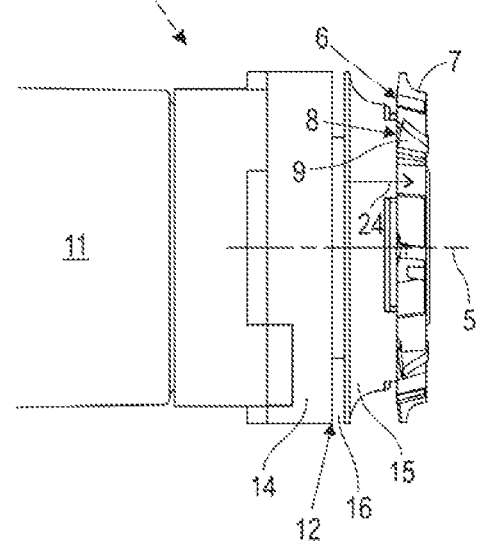
FIG. 3 shows the arrangement according to FIG. 2 with a second tool section which is situated in an active position; and, FIG. 4 shows a sectional illustration of the switchable tool system according to FIGS. 1 to 3 in the two switching states for milling two different edge profiles.

FIGS. 2 and 3 show a side view of the tool unit 1 according to FIG. 1 in different switching states, identical features being provided here with identical designations. FIG. 2 shows a switching state, in the case of which the second tool section 8 including its second blades 9 and the actuating armature 15 is retracted in the direction of an arrow 23 via the switching drive 12 or the electromagnet 14 relative to the first tool section 6 which is fixed in the axial direction. In this passive position, the second blades 9 are retracted axially in the direction of the rotational axis 5 in accordance with the arrow 23 with respect to the first blades 7. Despite the greatest possible axial approach which has occurred in the process, a gap 16 remains between the electromagnet 14 and the actuating armature 15, with the result that the two components are not in contact. The gap size of the gap 16 in the passive position which is shown advantageously lies in a region of approximately 0.5 mm, a range of from 0.2 mm to 1.0 mm expediently coming into question.

In contrast to this, FIG. 3 shows the switching state, in the case of which the second tool section 8 including its second blades 9 and the actuating armature 15 is situated in an active position. Starting from the passive position according to FIG. 2, the structural unit has therefore experienced an axial displacement in the direction of an arrow 24 in a manner which points away from the electromagnet 14. The displacement travel is selected in such a way that the second blades 9 with the rectilinear blade profile project axially through in the direction of the arrow 24 between the first, concave blades 7 in the active position according to FIG. 3. The displacement travel which is required for this purpose advantageously lies in a range of from approximately 2 to 4 mm, the gap size of the gap 16 having increased by the magnitude of the displacement travel in comparison with the passive position according to FIG. 2. In any case, it becomes clear that the gap 16 with a gap size of >0 remains between the at least one electromagnet 14 and the actuating armature 15 both in the passive position and in the active position.

It can be gathered from the illustration according to FIGS. 1 to 3 that the tool unit 1 is made substantially of two sections, namely firstly of the drive motor 11 and secondly of a switchable tool system which includes the above-described tool head 10 and the likewise above-described switching drive 12. The switchable tool system is positioned and fastened overall on/to only one axial end side of the drive motor 11, with the result that merely corresponding fastening interfaces but not structural intrusions into the drive motor 11 per se are required. A customary, commercially available drive motor 11 can be selected or even retrofitted; the switchable tool system with the tool head 10 and the switching drive 12 is then to be mounted at only one front-side end thereof.

Figure 4:
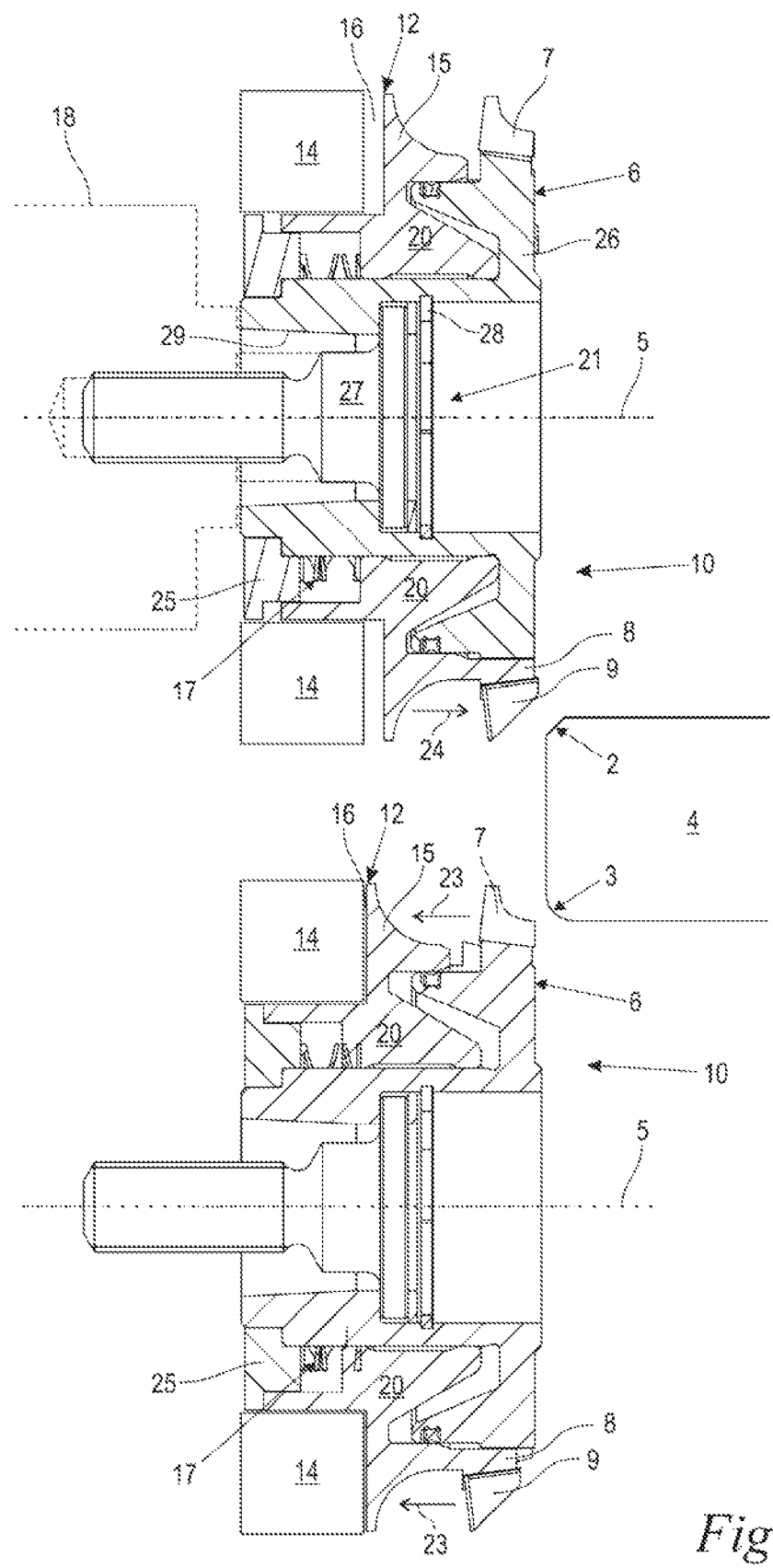

For the clarification of further structural details, FIG. 4 shows the switchable tool system according to FIGS. 1 to 3 in a sectional illustration, two identical switchable tool systems which, in the case of an identical structural construction, differ merely in terms of their switching state being shown for improved comprehension. Accordingly, the tool head 10 includes a central body 26, on which the first tool section 6 with the first blades 7 which are fastened to it is configured in one piece. A conical seat 29 is shaped in the central body 26 for the formation of a fastening interface 21 to a drive shaft 18 of the drive motor 11 (FIGS. 1 to 3), which conical seat 29 comes to lie on a clamping cone of the drive shaft 18 in the assembled state. Moreover, a central clamping screw 27 is part of the fastening interface 21, which central clamping screw 27 is fixed loosely in the central body 26 via a securing ring 28 and is screwed into an end-side threaded bore of the drive shaft 18 for assembly purposes. Via the central clamping screw 27, the tool head 10 is pulled via its central body 26 onto the clamping cone of the drive shaft 18, with the result that a centered unit which is fixed for conjoint rotation including of the tool head 10 and the drive shaft 18 is formed. Further fastenings or mountings of the tool head 10 are neither required nor provided. The tool head 10 is mounted exclusively via the drive shaft 18 and is otherwise free from contact with respect to the electromagnet 14.

The second tool section 8 which can be displaced in the axial direction with respect to the stationary first tool section 6 has a main body 20, to which the second blades 9 are fastened. Individual elements which are made from a magnetically attractable material can be arranged, fastened or embedded in or to the main body 20, in order to form the actuating armature 15 in this way. They can be permanent magnets. In an embodiment which is shown, the actuating armature 15 is made overall of a magnetically soft material, namely of tool steel, and is configured in one piece with the main body 20. In a manner which corresponds to the actuating armature 15, a plurality of electromagnets 14 can be arranged, in particular, concentrically around the rotational axis 5. In the embodiment which is shown, the electromagnet 14 is configured as a toric magnet, whereas the actuating armature 15 is likewise of annular configuration in a manner which corresponds thereto. The main body 20 with the integrally formed actuating armature 15 and also the electromagnet 14 which is configured as a toric magnet are positioned concentrically with respect to the rotational axis 5, as a result of which a compact, tilt-free overall configuration is produced.

At its end which faces the electric drive motor 11, the central body 26 supports a circumferential pressure piece 25, on which a compression spring element 17 is supported. The compression spring element 17 can be an arrangement having a plurality of compression coil springs which are distributed over the circumference, a disk spring assembly or the like, and, in the embodiment which is shown, is a zigzag spring which is arranged concentrically with respect to the rotational axis 5. In the opposite direction, the compression spring element 17 is supported against an end face of the second tool section 8 and is provided with an axial compression prestress. As a consequence of the axial compression prestress, the second tool section 8 is prestressed and pressed into its active position in accordance with the arrow 24 in a manner which points away from the switching drive 12. In the upper part of FIG. 4, the electromagnet 14 is passive, that is, non-energized, with the result that it does not exert an axial actuating force on the actuating armature 15. As a consequence, the prestressing force of the compression spring element 17 leads to the second tool section 8 being displaced in the direction of the arrow 24 and in the process assuming its active position. Otherwise, the active position is maintained by way of the prestressing force of the spring element 17, with the result that a separate locking means is not required. In any case, the second blades 9 project axially between the first blades 7 in this active position to such an extent that they configure an edge 2 on the workpiece 4 in accordance with the blade profile of the second blades 9, that is, in the form of a 45° chamfer here.

If, however, a suitable supply voltage is applied to the electromagnet 14 and the latter is supplied with current as a result, the electromagnet 14 exerts an axial attraction force on the actuating armature 15 and therefore on the second tool section 8 overall. The electromagnet 14 and the actuating armature 15 are dimensioned and configured in such a way that the attraction force is sufficient to overcome the compression prestressing force of the compression spring element 17. This state is shown in the lower part of FIG. 4, the second tool section 8 being retracted against a stop on the pressure piece 25 into the above-described passive position and being held there by way of the attraction force of the electromagnet 14. In the retracted passive position, the second, rectilinear blades 9 are retracted axially with respect to the first, concave blades 7, with the result that the tool head 10 produces an edge 3 with a corresponding (here, rounded) profile on the workpiece 4.

The switchover between the active and the passive position and therefore the switchover between the different milling profiles of the edges 2, 3 to be produced take place solely by way of the interaction of the electromagnet 14 which is switched on or off as selected, of the actuating armature 15 and of the compression spring element 17 which is preferably used.

It is understood that the foregoing description is that of the preferred embodiments of the invention and that various changes and modifications may be made thereto without departing from the spirit and scope of the invention as defined in the appended claims.

What is claimed is:

1. A tool unit for machining edges of a workpiece, wherein the tool unit extends along a rotational axis, the tool unit comprising:
   a tool head extending along the rotational axis and defining a circumference;
   a drive motor configured to rotationally drive said tool head about the rotational axis and having a housing part;
   a switching drive for said tool head;
   said tool head including a first tool section having a set of first blades distributed over the circumference;
   said tool head including a second tool section having a set of second blades distributed over the circumference;
   each of said second blades being positioned between two of said first blades as viewed in a circumferential direction;
   said second tool section being configured to be movable to and fro between a passive position and an active position relative to said first tool section in a direction of the rotational axis via said switching drive;
   said second blades being axially retracted with respect to said first blades when said second tool section is in said passive position;
   said second blades being axially projected with respect to said first blades when said second tool section is in said active position;
   said switching drive including: (i) at least one electromagnet, and (ii) an actuating armature which is made from a magnetically attractable material and is arranged in a region of action of said at least one electromagnet;
   said at least one electromagnet being positioned in an axial direction between said tool head and said drive motor;
   said at least one electromagnet being fastened to said housing part of said drive motor such that said at least one electromagnet cannot be rotated;
   said actuating armature being fixedly connected to said second tool section; and,
   said at least one electromagnet and said actuating armature defining a gap both when said second tool section is in said passive position and when said second tool section is in said active position.

2. The tool unit of claim 1, wherein said actuating armature is manufactured from a magnetically soft material.

3. The tool unit of claim 1 further comprising:
   a compression spring element configured to pre-stress said second tool section in a direction that is toward said active position and that points away from said switching drive; and,
   said switching drive being configured to attract said second tool section out of said active position into said passive position counter to a pre-stressing force of said compression spring element.

4. The tool unit of claim 3, wherein said compression spring element is configured as a zigzag spring which is arranged concentrically with respect to the rotational axis.

5. The tool unit of claim 1, wherein said at least one electromagnet is configured as a toric magnet; said actuating armature is of annular design in a manner which corresponds to said toric magnet; and, said toric magnet and said annular actuating armature are arranged concentrically with respect to the rotational axis.

6. The tool unit of claim 1, wherein said drive motor includes a drive shaft; said tool head is fastened to said drive shaft of said drive motor; and, said tool head and said at least one electromagnet do not make contact.

7. The tool unit of claim 1, wherein said second tool section has a main body; and, said main body and said actuating armature are configured in one piece from the magnetically attractable material.

8. A switchable tool system for a tool unit, the tool unit including a drive motor having a housing part and a drive shaft, the switchable tool system comprising:
- a tool head defining a circumference and configured to be rotationally driven about a rotational axis by the drive motor;
- a switching drive for said tool head;
- said tool head extending along the rotational axis;
- said tool head including a first tool section having a set of first blades distributed over the circumference;
- said tool head further including a second tool section having a set of second blades distributed over the circumference;
- each of said second blades being positioned between two of said first blades as viewed in a circumferential direction;
- said second tool section being configured to be moveable to and fro between a passive position and an active position relative to said first tool section in a direction of the rotational axis via said switching drive;
- said second blades being axially retracted with respect to said first blades when said second tool section is in said passive position;
- said second blades being axially projected with respect to said first blades when said second tool section is in said active position;
- said switching drive having: (i) an actuating armature which is made from a magnetically attractable material, and (ii) at least one electromagnet configured to act on said actuating armature;
- said at least one electromagnet having a fastener for fastening, at an axial position between the tool head and said drive motor, the at least one electromagnet to the housing part of the drive motor such that the at least one electromagnet cannot be rotated;
- said actuating armature being connected fixedly to said second tool section; and,
- said tool head having a fastening interface for fastening to the drive shaft of the drive motor.

* * * * *